United States Patent
Iden et al.

(10) Patent No.: US 10,756,374 B2
(45) Date of Patent: Aug. 25, 2020

(54) CATALYST DETERIORATION RECOVERY DEVICE AND CATALYST DETERIORATION RECOVERY METHOD

(71) Applicant: NISSAN MOTOR CO., LTD., Yokohama-shi, Kanagawa (JP)

(72) Inventors: Hiroshi Iden, Kanagawa (JP); Yoshitaka Ono, Kanagawa (JP); Satoshi Takaichi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 47 days.

(21) Appl. No.: 16/323,077

(22) PCT Filed: Aug. 12, 2016

(86) PCT No.: PCT/JP2016/073786
§ 371 (c)(1),
(2) Date: Feb. 4, 2019

(87) PCT Pub. No.: WO2018/029859
PCT Pub. Date: Feb. 15, 2018

(65) Prior Publication Data
US 2020/0185746 A1    Jun. 11, 2020

(51) Int. Cl.
*H01M 8/10* (2016.01)
*H01M 8/1004* (2016.01)
(Continued)

(52) U.S. Cl.
CPC ....... *H01M 8/1004* (2013.01); *H01M 8/0258* (2013.01); *H01M 8/0267* (2013.01);
(Continued)

(58) Field of Classification Search
CPC ............. H01M 8/1004; H01M 8/0258; H01M 8/0267; H01M 8/04223; H01M 8/04664;
(Continued)

(56) References Cited

U.S. PATENT DOCUMENTS 7,931,935 B2 *  4/2011  Yamamoto ............ C23C 14/185
                                                                 427/115
7,976,972 B2 *  7/2011  Arisaka ............. H01M 8/04223
                                                                 429/48
(Continued)

FOREIGN PATENT DOCUMENTS

JP    07-105967 A    4/1995
JP    2004-146209 A  5/2004
(Continued)

*Primary Examiner* — Raymond Alejandro
(74) *Attorney, Agent, or Firm* — Foley & Lardner LLP

(57) ABSTRACT

A catalyst deterioration recovery device in a fuel cell system that includes a fuel cell including a membrane electrode assembly configured to include an electrolyte membrane and anode and cathode catalysts between which the electrolyte membrane is sandwiched from both sides and anode and cathode separators respectively including an anode gas flow channel and a cathode gas flow channel, the membrane electrode assembly being sandwiched between the anode and cathode separators. The catalyst deterioration recovery device recovers performance decreased by adsorption of carbon monoxide to the anode catalyst. The catalyst deterioration recovery device includes a recovery control unit configured to supply at least a part of oxygen to be supplied to the cathode gas flow channel to the anode catalyst via the electrolyte membrane.

15 Claims, 11 Drawing Sheets

(51) Int. Cl.
*H01M 8/04223* (2016.01)
*H01M 8/04746* (2016.01)
*H01M 8/0258* (2016.01)
*H01M 8/04701* (2016.01)
*H01M 8/04828* (2016.01)
*H01M 8/0267* (2016.01)
*H01M 8/04664* (2016.01)

(52) U.S. Cl.
CPC ..... *H01M 8/0485* (2013.01); *H01M 8/04223* (2013.01); *H01M 8/04664* (2013.01); *H01M 8/04723* (2013.01); *H01M 8/04753* (2013.01)

(58) Field of Classification Search
CPC ......... H01M 8/04723; H01M 8/04753; H01M 8/0485
See application file for complete search history.

(56) References Cited

U.S. PATENT DOCUMENTS

| | | | |
|---|---|---|---|
| 8,603,697 B2* | 12/2013 | Miyazaki | H01M 4/8871 429/137 |
| 8,685,588 B2* | 4/2014 | Yamada | H01M 8/0273 429/480 |
| 9,065,100 B2 | 6/2015 | Iden et al. | |
| 2003/0228504 A1 | 12/2003 | Konrad et al. | |
| 2005/0233191 A1 | 10/2005 | Ushio | |
| 2014/0120439 A1 | 5/2014 | Makino et al. | |

FOREIGN PATENT DOCUMENTS

| | | |
|---|---|---|
| JP | 3536645 B2 | 6/2004 |
| JP | 2005-25985 A | 1/2005 |
| JP | 2005-235522 A | 9/2005 |
| JP | 2005-310464 A | 11/2005 |
| JP | 2008-41478 A | 2/2008 |
| JP | 2008-293701 A | 12/2008 |
| JP | 4969955 B2 | 7/2012 |
| JP | 5008319 B2 | 8/2012 |
| JP | 5151035 B2 | 2/2013 |
| JP | 2016-66407 A | 4/2016 |
| KR | 10-2008-0048216 A | 6/2008 |
| WO | WO-2008/082036 A1 | 7/2008 |
| WO | WO 2012/176528 A1 | 12/2012 |

\* cited by examiner

CATALYST DETERIORATION RECOVERY DEVICE AND CATALYST DETERIORATION RECOVERY METHOD

TECHNICAL FIELD

The present invention relates to a deterioration recovery device and a deterioration recovery method of an electrode used for a fuel cell system.

BACKGROUND ART

In a fuel cell system that supplies fuel gas containing hydrogen to a fuel electrode and supplies oxygen-containing gas to an oxygen electrode to perform power generation, an electrode reaction is blocked and thus power performance is decreased when a phenomenon, in which carbon monoxide (hereinafter, also called "CO") adsorbs onto an electrode catalyst of the fuel electrode, so-called CO poisoning occurs.

As a process (hereinafter, also called "catalyst recovery process") for resolving the CO poisoning, Japanese Patent Application Laid-Open No. 2005-25985 and Japanese Patent No. 5008319 disclose a method of causing fuel gas to be supplied to a fuel electrode to contain oxygen and thus oxidizing CO to detach it from an electrode catalyst. Moreover, Japanese Patent No. 3536645, Japanese Patent No. 4969955, and Japanese Patent No. 5151035 disclose related descriptions on the catalyst recovery process for the fuel electrode.

SUMMARY OF INVENTION

However, there is a possibility that the catalyst recovery process performed by causing fuel gas to contain oxygen as described above deteriorates an electrolyte membrane due to reaction heat generated by the reaction of hydrogen and oxygen on the electrode catalyst.

Therefore, an object of the present invention is to provide an apparatus and a method that can execute a catalyst recovery process while suppressing the deterioration of an electrolyte membrane.

According to an aspect of this invention, there is provided a catalyst deterioration recovery device in a fuel cell system that includes a fuel cell including a membrane electrode assembly configured to include an electrolyte membrane and anode and cathode catalysts between which the electrolyte membrane is sandwiched from both sides and anode and cathode separators respectively including an anode gas flow channel and a cathode gas flow channel, the membrane electrode assembly being sandwiched between the anode and cathode separators. The catalyst deterioration recovery device recovers performance decreased by adsorption of carbon monoxide to the anode catalyst. The catalyst deterioration recovery device includes a recovery control unit configured to supply at least a part of oxygen to be supplied to the cathode gas flow channel to the anode catalyst via the electrolyte membrane.

According to an aspect of this invention, there is provided an apparatus and a method that can execute a catalyst recovery process while suppressing the deterioration of an electrolyte membrane.

DESCRIPTION OF EMBODIMENTS

Hereinafter, exemplary embodiments of the present invention will be explained with reference to the accompanying drawings.

First Embodiment

Figure 1:
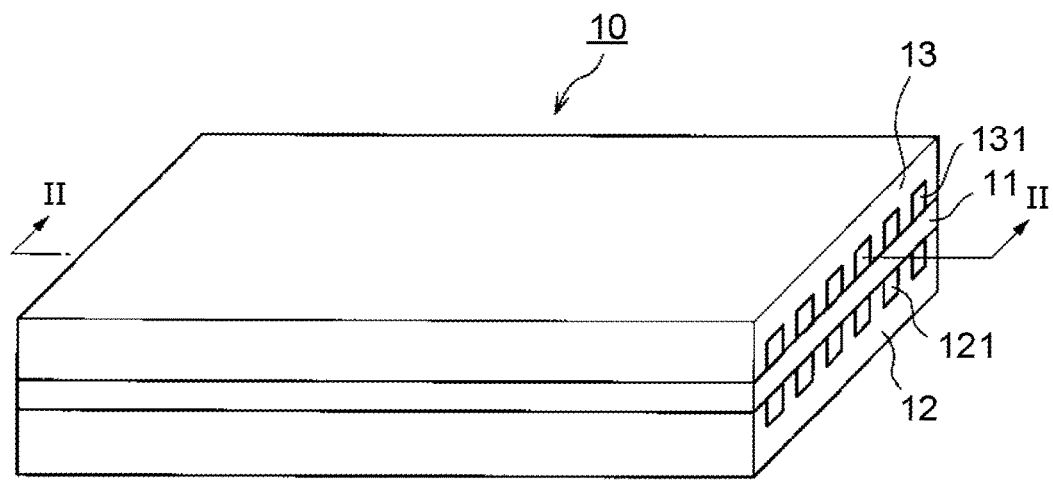
FIG. 1 is a perspective diagram illustrating a fuel cell.
Figure 2:
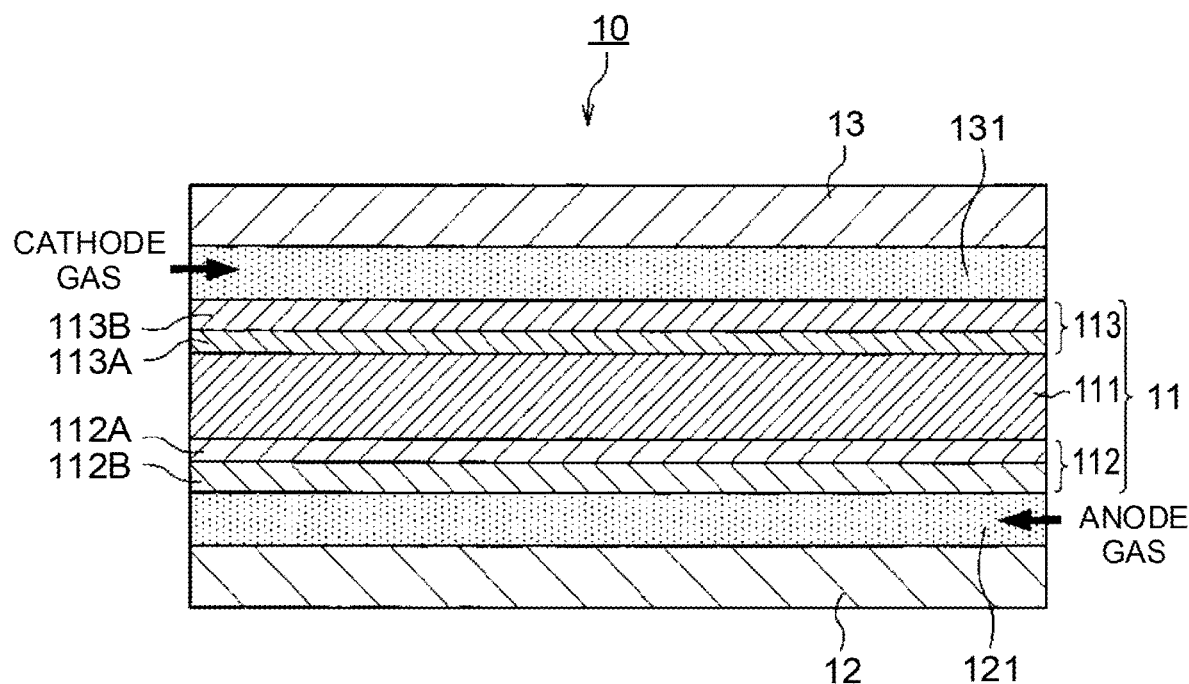
FIG. 2 is a cross-sectional diagram viewed from the II-II line of FIG. 1.

FIGS. 1 and 2 are diagrams explaining the configuration of a fuel cell 10 according to an embodiment of the present invention. FIG. 1 is a perspective diagram illustrating the fuel cell 10 and FIG. 2 is a cross-sectional diagram viewed from the II-II line of the fuel cell 10 illustrated in FIG. 1.

The fuel cell 10 includes a membrane electrode assembly (MEA) 11 and anode and cathode separators 12 and 13 that are arranged to sandwich the MEA 11 therebetween.

The MEA 11 is configured to include an electrolyte membrane 111, an anode electrode 112, and a cathode electrode 113. The MEA 11 includes the anode electrode 112 on one side and the cathode electrode 113 on the other side of the electrolyte membrane 111.

The electrolyte membrane 111 is an ion exchange membrane having proton conductivity formed of fluorinated resin. The electrolyte membrane 111 shows good electrical conductivity in a wet/dry state.

The anode electrode 112 includes a catalyst layer 112A and a gas diffusion layer 112B. The catalyst layer 112A is a member formed of platinum or carbon black particles carrying platinum etc. and is provided to be in contact with the electrolyte membrane 111. The gas diffusion layer 112B is placed outside the catalyst layer 112A. The gas diffusion layer 112B is a member formed of carbon cloth having gas diffusibility and electrical conductivity and is provided to be in contact with the catalyst layer 112A and the anode separator 12.

Similarly to the anode electrode 112, the cathode electrode 113 also includes a catalyst layer 113A and a gas diffusion layer 113B. The catalyst layer 113A is placed between the electrolyte membrane 111 and the gas diffusion layer 113B, and the gas diffusion layer 113B is placed between the catalyst layer 113A and the cathode separator 13.

The anode separator 12 is placed outside the gas diffusion layer 112B. The anode separator 12 includes a plurality of anode gas flow channels 121 configured to supply anode gas (hydrogen gas) to the anode electrode 112. The anode gas flow channels 121 are formed as a groove-like passage.

The cathode separator 13 is placed outside the gas diffusion layer 113B. The cathode separator 13 includes a plurality of cathode gas flow channels 131 configured to supply cathode gas (air) to the cathode electrode 113. The cathode gas flow channels 131 are formed as a groove-like passage.

When using such the fuel cell 10 as a power source, a fuel cell stack in which a plurality of the fuel cells 10 is stacked in accordance with required electric power is used as the power source. For example, because required electric power is large when the fuel cell 10 is used as a power source for an automobile, the fuel cell stack is configured of several hundred of the fuel cells 10. A fuel cell system that supplies anode gas and cathode gas to the fuel cell stack is configured to take out electric power according to the request.

Figure 3:
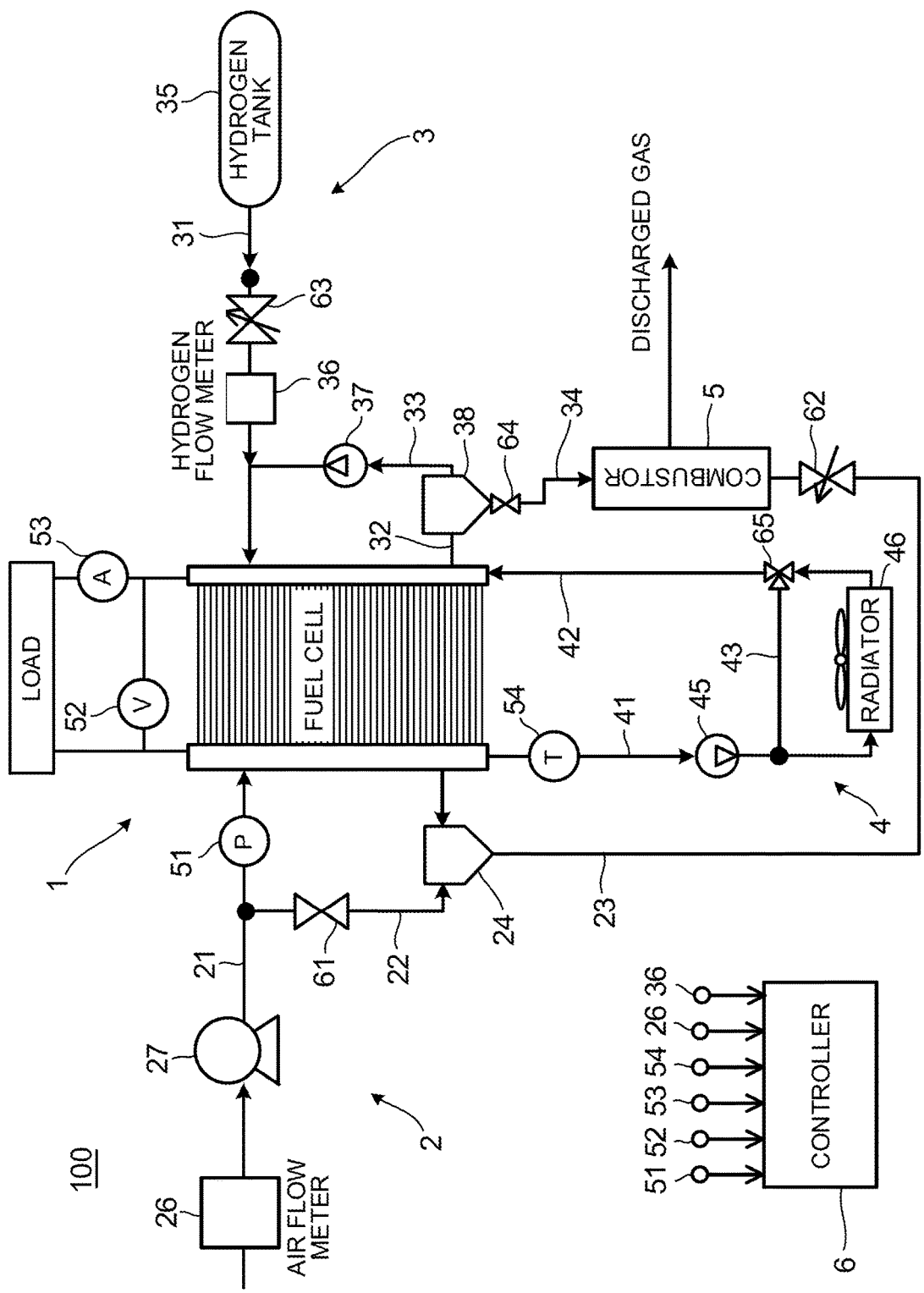
FIG. 3 is an example of a configuration diagram illustrating a fuel cell system.

FIG. 3 is a schematic diagram illustrating a fuel cell system 100 according to an embodiment of the present invention.

The fuel cell system 100 includes a fuel cell stack 1, a cathode gas supply/discharge apparatus 2, an anode gas supply/discharge apparatus 3, a cooling water circulation apparatus 4, a combustor 5, and a controller 6 acting as a recovery control unit.

The fuel cell stack 1 is a stacked battery in which the plurality of the fuel cells 10 (unit cell) is stacked. The fuel cell stack 1 receives the supply of anode gas and cathode gas to generate electricity. As output terminals for taking out electric power, the fuel cell stack 1 includes an anode-electrode side terminal and a cathode-electrode side terminal.

The cathode gas supply/discharge apparatus 2 supplies cathode gas to the fuel cell stack 1 and supplies cathode offgas discharged from the fuel cell stack 1 to the combustor 5. The cathode gas supply/discharge apparatus 2 includes a cathode gas supply passage 21, a cathode bypass passage 22, and a cathode gas discharge passage 23.

An air flow meter 26, a compressor 27, and a cathode pressure sensor 51 are arranged in the cathode gas supply passage 21. One end of the cathode gas supply passage 21 is connected to a cathode gas inlet of the fuel cell stack 1.

The air flow meter 26 detects a flow rate of cathode gas to be supplied to the fuel cell stack 1.

The compressor 27 is placed in the cathode gas supply passage 21 on the downstream side from the air flow meter 26. The operation of the compressor 27 is controlled by the controller 6, and the compressor 27 pumps the cathode gas in the cathode gas supply passage 21 to supply the gas to the fuel cell stack 1.

The cathode pressure sensor 51 is placed in the cathode gas supply passage 21 on the downstream side from the branching portion with the cathode bypass passage 22. The cathode pressure sensor 51 detects the pressure of the cathode gas to be supplied to the fuel cell stack 1. The cathode gas pressure detected by the cathode pressure sensor 51 represents the pressure of the entire cathode system including the cathode gas flow channels etc. of the fuel cell stack 1.

The cathode gas discharge passage 23 is a passage through which cathode offgas discharged from the fuel cell stack 1 flows. The cathode offgas is mixed gas including cathode gas, water vapor generated by an electrode reaction, and the like. One end of the cathode gas discharge passage 23 is connected to a cathode gas outlet of the fuel cell stack 1, and the other end is connected to an inlet of the combustor 5. A water separator 24 configured to separate water vapor from the cathode offgas is placed in the cathode gas discharge passage 23. Moreover, an air control valve 62 configured to adjust the flow rate of the cathode offgas is placed on the downstream side from the water separator 24 in the cathode gas discharge passage 23 and on the upstream side from the combustor 5.

The cathode bypass passage 22 is a passage configured to branch off from the cathode gas supply passage 21 and join the upstream side from the water separator 24 in the cathode gas discharge passage 23. In other words, the cathode bypass passage 22 is a passage configured to supply cathode gas to the combustor 5 without making the cathode gas pass through the fuel cell stack 1. A cathode bypass valve 61 is placed in the cathode bypass passage 22. The cathode bypass valve 61 is controlled to be opened and closed by the controller 6 to adjust the flow rate of cathode gas passing through the cathode bypass passage 22.

Next, the anode gas supply/discharge apparatus 3 will be explained.

The anode gas supply/discharge apparatus 3 supplies anode gas to the fuel cell stack 1 and supplies anode offgas discharged from the fuel cell stack 1 to the combustor 5. The anode gas supply/discharge apparatus 3 includes a hydrogen tank 35, an anode gas supply passage 31, a hydrogen supply valve 63, a hydrogen flow meter 36, an anode gas discharge passage 32, an anode gas circulation passage 33, a hydrogen circulating pump 37, and a purge valve 64.

The hydrogen tank 35 is a container that stores anode gas to be supplied to the fuel cell stack 1 while maintaining the gas in a high-pressure state.

The anode gas supply passage 31 is a passage configured to supply the anode gas discharged from the hydrogen tank 35 to the fuel cell stack 1. One end of the anode gas supply passage 31 is connected to the hydrogen tank 35 and the other end is connected to an anode gas inlet of the fuel cell stack 1.

The hydrogen supply valve 63 is placed in the anode gas supply passage 31 on the downstream side from the hydrogen tank 35. The hydrogen supply valve 63 is controlled to be opened and closed by the controller 6 to adjust the pressure of the anode gas to be supplied to the fuel cell stack 1.

The hydrogen flow meter 36 is provided in the anode gas supply passage 31 on the downstream side from the hydrogen supply valve 63. The hydrogen flow meter 36 detects the flow rate of anode gas to be supplied to the fuel cell stack 1. The flow rate detected by the hydrogen flow meter 36 represents the flow rate of the entire anode system including the anode gas flow channels of the fuel cell stack 1. In addition, a hydrogen pressure gage may be placed instead of the hydrogen flow meter 36. In this case, a pressure detected by the hydrogen pressure gage represents the pressure of the entire anode system.

The anode gas discharge passage 32 is a passage through which the anode offgas discharged from the fuel cell stack 1 flows. One end of the anode gas discharge passage 32 is connected to an anode gas outlet of the fuel cell stack 1 and the other end is connected to an anode gas inlet of the combustor 5. The anode offgas contains anode gas that is not used in the electrode reaction, impurity gas such as nitrogen leaked from the cathode gas flow channels 131 to the anode gas flow channels 121, moisture, and the like.

A water separator 38 configured to separate moisture from the anode offgas is placed in the anode gas discharge passage 32. The purge valve 64 is provided in the anode gas discharge passage 32 on the downstream side from the water separator 38. The purge valve 64 is controlled to be opened and closed by the controller 6 to adjust the flow rate of anode gas to be supplied to the combustor 5 from the anode gas discharge passage 32.

The anode gas circulation passage 33 branches off from the anode gas discharge passage 32 on the downstream side from the water separator 38 and joins the anode gas supply passage 31 on the downstream side from the hydrogen flow meter 36. The hydrogen circulating pump 37 is placed in the anode gas circulation passage 33. The operation of the hydrogen circulating pump 37 is controlled by the controller 6.

The purge valve 64 is controlled to be opened and closed by the controller 6 to control the flow rate of anode offgas to be supplied to the combustor 5.

Next, the cooling water circulation apparatus 4 will be explained.

The cooling water circulation apparatus 4 includes a cooling water discharge passage 41, a cooling water pump 45, a radiator 46, a cooling water supply passage 42, a cooling-water temperature sensor 54, a cooling water bypass passage 43, and a cooling water bypass valve 65.

The cooling water discharge passage 41 is a passage through which cooling water discharged from the fuel cell stack 1 passes. One end of the cooling water discharge passage 41 is connected to a cooling water outlet of the fuel cell stack 1 and the other end is connected to an inlet of the radiator 46.

The operation of the cooling water pump 45 is controlled by the controller 6 to adjust the circulation amount of the cooling water.

The radiator 46 cools cooling water heated up by heat received from the fuel cell stack 1 by using heat exchange with the atmospheric air. In addition, although the air-cooled radiator 46 configured to cool cooling water by using heat exchange with the atmospheric air is employed in the present embodiment, the radiator 46 may employ a liquid-cooled radiator configured to cool cooling water by using heat exchange with a cooling medium.

The cooling water bypass passage 43 branches off from the cooling water discharge passage 41 on the downstream side from the cooling water pump 45 and on the upstream side from the radiator 46 and joins the cooling water supply passage 42 on the downstream side from the radiator 46. The cooling water bypass valve 65 is provided in a joining portion between the cooling water bypass passage 43 and the cooling water supply passage 42.

The cooling water bypass valve 65 is controlled to be opened and closed by the controller 6 to adjust the flow rate of the cooling water passing through the radiator 46.

The cooling-water temperature sensor 54 is placed in the cooling water discharge passage 41 on the upstream side from the cooling water pump 45.

A voltage sensor 52 and a current sensor 53 are provided in the fuel cell stack 1. The voltage sensor 52 detects the output voltage of the fuel cell stack 1, namely, a voltage between terminals of the anode-electrode side terminal and the cathode-electrode side terminal. The voltage sensor 52 may be configured to detect a voltage for each cell of the fuel cells 10 or may be configured to detect a voltage for every plural cells of the fuel cells 10. The current sensor 53 detects an output current taken out from the fuel cell stack 1.

The combustor 5 is a device configured to react oxygen in the cathode gas and hydrogen in the anode offgas to obtain heat by using a platinum catalyst, for example.

The controller 6 is configured by a microcomputer that includes a central processing unit (CPU), a read-only memory (ROM), a random-access memory (RAM), and an input-output interface (I/O interface). The controller 6 may be configured by a plurality of microcomputers. Signals from the air flow meter 26, the hydrogen flow meter 36, the cooling-water temperature sensor 54, the voltage sensor 52, the current sensor 53, and the like are input into the controller 6.

Next, carbon monoxide (CO) poisoning of an anode catalyst (e.g., platinum) carried in the catalyst layer 112A of the anode electrode 112 will be explained with reference to FIGS. 4 and 5.

CO to be adsorbed to the anode catalyst is contained in anode gas and/or is generated in the anode electrode 112.

Figure 4:
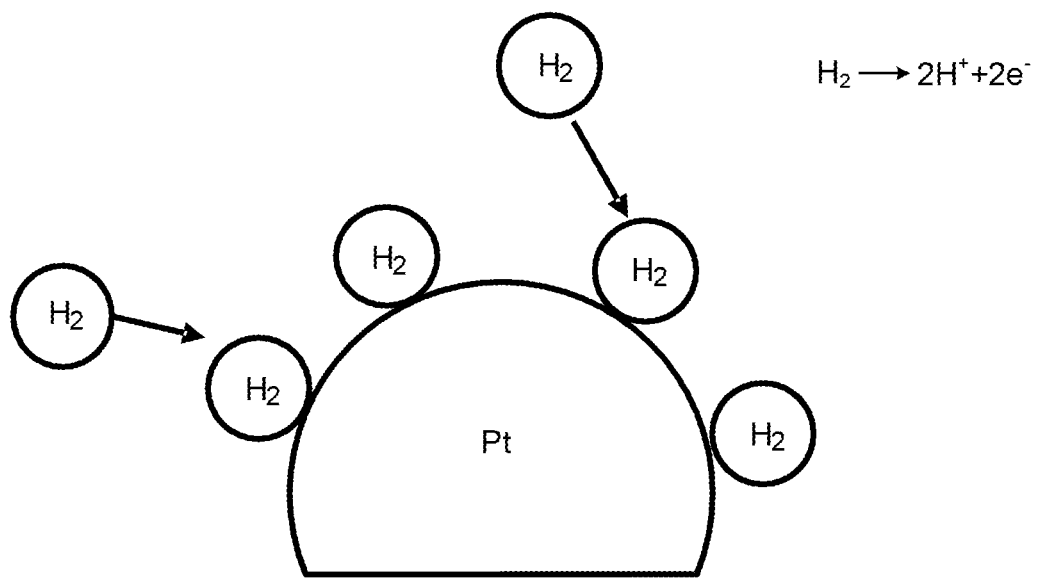
FIG. 4 is a diagram illustrating a reaction on an anode catalyst in a state in which CO poisoning does not occur.

As illustrated in FIG. 4, in a state in which the CO poisoning does not occur, namely, in a normal state, hydrogen contained in anode gas causes an electrode reaction (Formula (1)).

$$H_2 \rightarrow 2H^+ + 2e^- \tag{1}$$

Figure 5:
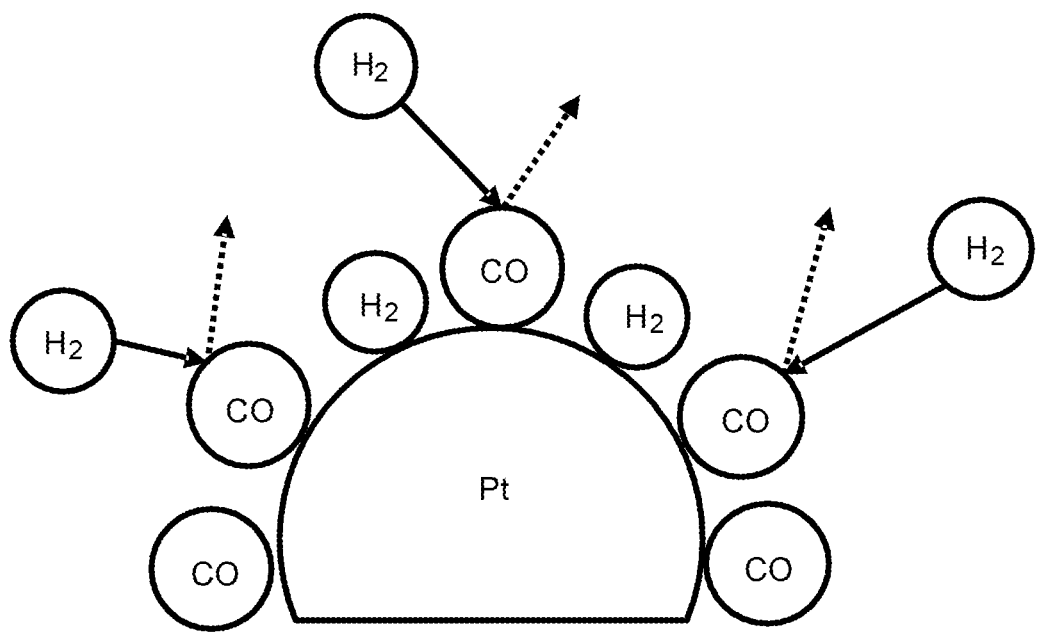
FIG. 5 is a diagram illustrating a reaction on the anode catalyst in a state in which the CO poisoning occurs.

However, as illustrated in FIG. 5, an electrode reaction on the anode electrode 112 is blocked when the CO poisoning occurs on the anode catalyst. As a result, because the electric potential of the anode electrode rises and thus a potential difference between the anode electrode 112 and the cathode electrode 113 decreases, the power performance of the fuel cell 10 is decreased.

To avoid performance degradation caused by such the CO poisoning, it is necessary to remove CO adsorbed to the anode catalyst to recover the anode catalyst from the CO poisoning. As a catalyst recovery process to recover the anode catalyst from the CO poisoning, there is conventionally known a method of supplying anode gas containing oxygen to the anode catalyst and thus oxidizing CO adsorbed to the anode catalyst to eliminate CO from the anode catalyst.

Figure 6:
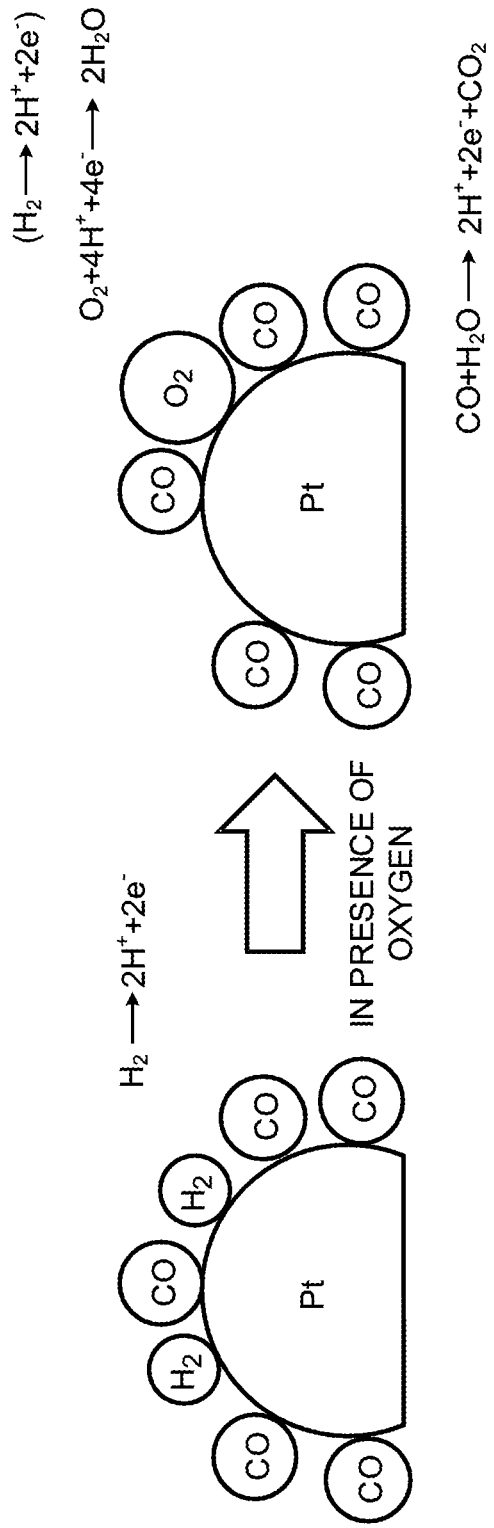
FIG. 6 is a diagram explaining the conventional thinking on recovery from the CO poisoning.

FIG. 6 is a diagram explaining the conventional thinking on the catalyst recovery process.

Conventionally, a mechanism for recovering an anode catalyst from CO poisoning by supplying oxygen has been considered as described below.

When anode gas containing oxygen is supplied to the anode electrode 112, a reaction of Formula (2) occurs to consume electrons generated from the reaction of Formula (1) besides the electrode reaction of Formula (1) described above and thus the electric potential of the anode electrode is raised.

$$O_2 + 4H^+ + 4e^- \rightarrow 2H_2O \tag{2}$$

Then, when the electric potential of the anode electrode is raised by the reaction of Formula (2), CO adsorbed to the anode catalyst is oxidized by the reaction of Formula (3).

$$CO + H_2O \rightarrow 2H^+ + 2e^- + CO_2 \tag{3}$$

It has been considered that the oxidation reaction of CO by Formula (3) occurs after the electric potential of the anode electrode is raised and all the hydrogen on the anode catalyst is consumed. For this reason, a sufficient amount of oxygen to raise the electric potential of the anode electrode has been conventionally supplied up to the electric potential at which the oxidation reaction of CO occurs. However, because the reaction of Formula (2) to raise an electric potential is an exothermic reaction, the electrolyte membrane is deteriorated by heat generated by the reaction and this results in the performance degradation of the fuel cell 10.

Moreover, when oxygen is contained in anode gas, a local battery may be formed in the anode electrode and carbon of the catalyst layer 113A in the cathode electrode 113 may be oxidized and corroded. Such the corrosion of carbon causes the output reduction of the fuel cell 10.

Figure 7:
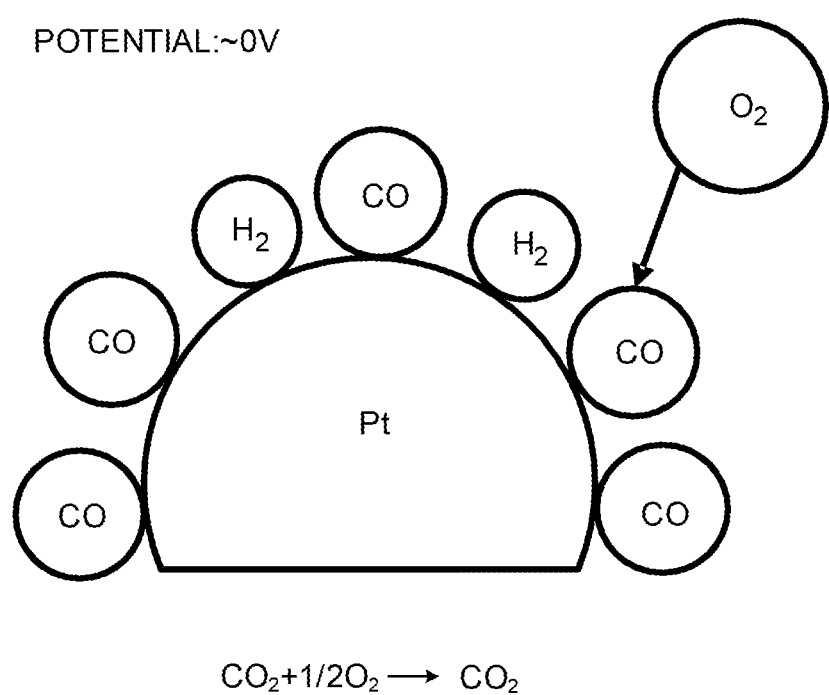
FIG. 7 is a diagram explaining a new finding on the recovery from the CO poisoning.

On the contrary, the inventors of the present invention have found that CO and oxygen react directly as illustrated in FIG. 7 and CO is eliminated from the anode catalyst even in a state where the electric potential of the anode electrode is low.

If the catalyst recovery process can be performed even if the electric potential of the anode electrode is not raised, an amount of oxygen contained in the anode gas can be reduced in order to suppress the generation of heat causing catalyst deterioration. However, in the catalyst recovery process based on the conventional thinking, because a ratio of an amount of oxygen required for the recovery from the poisoning to an amount of anode gas is small, for example, not more than several percent, the adjustment of the amount of oxygen to be contained was difficult. Therefore, to further reduce the amount of oxygen to be contained requires more difficult adjustment. In other words, in the method of making anode gas contain oxygen, it was difficult to suppress the performance degradation of the anode electrode and the fuel cell 10 accompanied with the catalyst recovery process.

Therefore, the present embodiment performs a catalyst recovery process that is below explained based on a new finding that oxygen directly reacts with CO to eliminate CO from the anode catalyst even in a state where the electric potential of an anode electrode is low.

Figure 8:
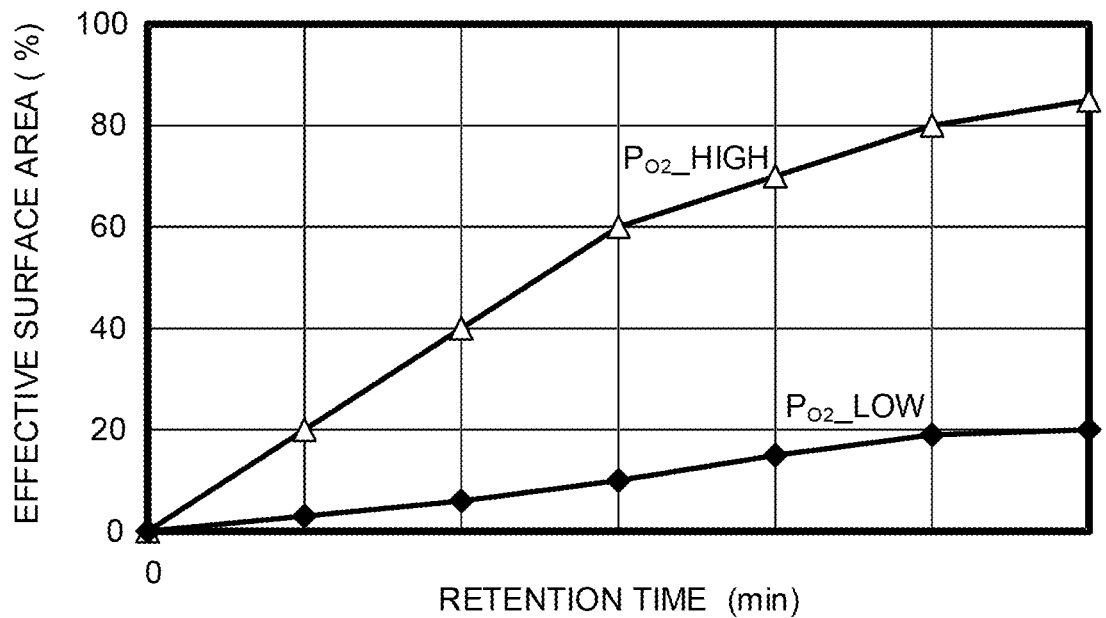
FIG. 8 is a diagram illustrating a relationship between an oxygen partial pressure and a recovery rate from the CO poisoning.

FIG. 8 is a diagram illustrating experimental results as the basis of the new finding described above. The vertical axis of FIG. 8 indicates an effective surface area ratio of the anode catalyst and the horizontal axis indicates a time. The effective surface area ratio is a ratio of an area contributing to an electrode reaction to the surface area of platinum acting as the anode catalyst. That is to say, the effective surface area ratio in a state where CO is not adsorbed is 100%. The effective surface area ratio can be estimated based on the voltage of the fuel cell 10, for example.

The experimental procedure is as follows. First, the CO poisoning is performed on the anode catalyst so that the effective surface area ratio becomes 0%. Then, the change in the effective surface area ratio is monitored while supplying hydrogen to an anode and mixed gas of oxygen and nitrogen to a cathode and maintaining the state of no power generation (OCV). FIG. 8 illustrates experimental results of two patterns in which the cathode-side oxygen partial pressures are different. The oxygen partial pressures are "$P_{O2\_high} > P_{O2\_low}$".

As illustrated in FIG. 8, the effective surface area ratio that was 0% at the beginning of the experiment gradually grows larger with the passage of time. From this, it turns out that CO is oxidized by oxygen cross-leaked from the cathode side to the anode side to be detached from the anode catalyst.

From FIG. 8, it turns out that the higher one of the cathode-side oxygen partial pressures has a bigger increase speed of the effective surface area ratio. A permeation flux F represented by Equation (4) is known as an index to evaluate the permeation performance of a membrane. It means that a permeation amount is more as the permeation flux F is larger.

Permeation flux $F$=Permeation coefficient $k$×Partial pressure difference $dP$ (4)

Figure 9:
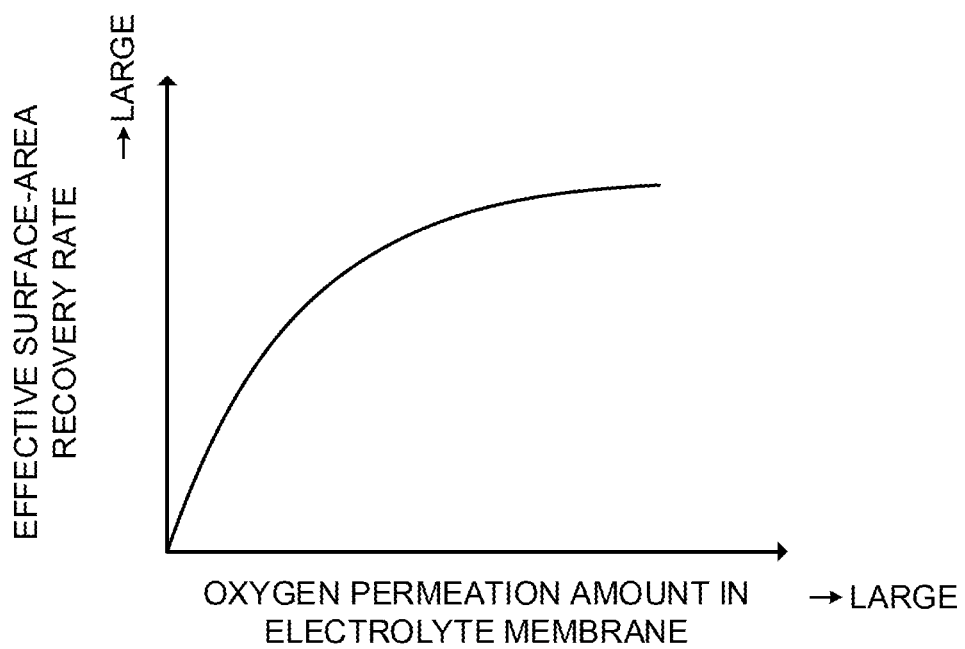
FIG. 9 is a diagram illustrating a relationship between an oxygen permeation amount of an electrolyte membrane and an effective surface-area recovery rate of the anode catalyst.

That the cathode-side oxygen partial pressure is high means that the partial pressure difference dP of Equation (4) is large. Therefore, it turns out that the recovery from CO poisoning can be more promptly performed as the permeation flux F of oxygen is larger, namely, an amount of cross-leaked oxygen is more. FIG. 9 illustrates the above contents as a drawing. The vertical axis of FIG. 9 indicates an effective surface-area recovery rate, namely, a degree of recovery from the CO poisoning. The horizontal axis of FIG. 9 indicates an oxygen permeation amount in the electrolyte membrane 111. As illustrated in FIG. 9, as the oxygen permeation amount in the electrolyte membrane 111 becomes more, the effective surface-area recovery rate grows larger.

Moreover, the part of the cross-leaked oxygen may be consumed without being provided for oxidation of CO due to the reaction with hydrogen. In other words, if anode-side hydrogen is small, an amount of oxygen provided for oxidation of CO is increased. From this, it turns out that decreasing the anode-side hydrogen partial pressure has the same effect as increasing an amount of oxygen to be cross-leaked.

Of course, to raise an oxygen partial pressure and decrease a hydrogen partial pressure also is effective for the recovery from CO poisoning.

If the catalyst recovery process is a method of using oxygen cross-leaked from the cathode side to the anode side, it is possible to suppress the deterioration of an electrolyte membrane due to heat generated by the reaction between hydrogen and oxygen because a probability that oxygen reacts to hydrogen on the anode catalyst is low as compared to the case where oxygen is contained in anode gas.

To raise an oxygen partial pressure, it is sufficient to raise a cathode-gas flow rate or a cathode-side pressure. The cathode-gas flow rate or the cathode-side pressure can be adjusted by using an oxygen-containing gas adjusting apparatus configured to include the air flow meter 26, the compressor 27, the cathode pressure sensor 51, and the cathode bypass valve 61. In this case, the cathode-gas flow rate or the cathode-side pressure is increased by increasing the rotation speed of the compressor 27 or by closing the cathode bypass valve 61 to increase a cathode pressure in such a manner that a flow rate to be detected by the air flow meter 26 is increased.

To decrease a hydrogen partial pressure, it is sufficient to decrease an anode-gas flow rate or an anode-side pressure. The anode-gas flow rate or the anode-side pressure can be adjusted by using a fuel gas adjusting apparatus configured to include the hydrogen flow meter 36 and the hydrogen supply valve 63. In this case, the anode-gas flow rate or the anode-side pressure is decreased by closing the hydrogen supply valve 63 so that a flow rate to be detected by the hydrogen flow meter 36 is decreased.

In the meantime, if oxygen is cross-leaked by using an oxygen supply apparatus including the oxygen-containing gas adjusting apparatus and the fuel gas adjusting apparatus described above, the anode catalyst can be recovered from the CO poisoning. However, the operating efficiency of the fuel cell system 100 is decreased. Therefore, if the catalyst recovery process is executed only when performance degradation caused by the CO poisoning occurs, the recovery from the CO poisoning is compatible with the maintenance of the operating efficiency of the fuel cell system 100.

Figure 10:
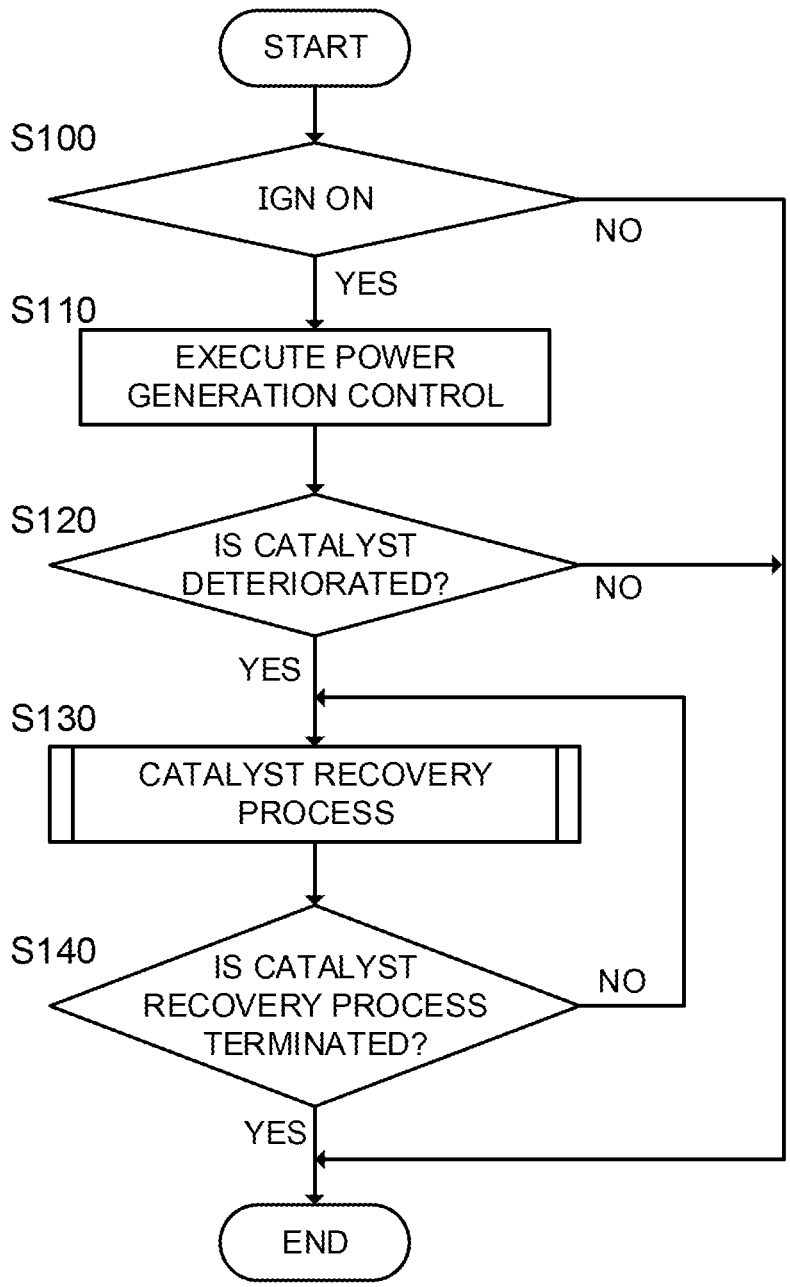
FIG. 10 is a flowchart illustrating a control routine of a catalyst recovery process.

FIG. 10 is a flowchart illustrating a control routine based on the above description.

In Step S100, the controller 6 determines whether an ignition switch (IGN) is ON. The controller 6 executes power generation control in Step S110 when the IGN is ON and terminates the present routine when the IGN is OFF.

In Step S120, the controller 6 determines whether the anode catalyst is deteriorated. The controller 6 executes the process of Step S130 when being deteriorated and terminates the present routine when not being deteriorated. The deterioration of the anode catalyst referred to here is the performance degradation caused by CO poisoning.

Whether or not the anode catalyst is deteriorated may be directly acquired (detected) or may be indirectly acquired (estimated).

A direct acquisition method is, for example, a method of previously acquiring a relationship between the current value and voltage value of the fuel cell stack 1 and determining that the anode catalyst is deteriorated when the voltage value detected by the voltage sensor 52 becomes lower than a voltage value assumed from the current value detected by the current sensor 53.

In addition, the performance of the fuel cell stack 1 is decreased over time in accordance with a usage time. Therefore, the controller can previously acquire a temporal voltage decrease amount from the unused state and determine that the anode catalyst is deteriorated when a voltage decrease amount of the voltage value detected by the voltage sensor 52 with respect to the unused state is larger than the previously acquired temporal voltage decrease amount.

An indirect acquisition method is, for example, a method of considering that the anode catalyst is deteriorated when a cumulative consumption amount of anode gas reaches a predetermined amount. This is a method of previously assuming a CO concentration in anode gas and speculating that the contained CO is adsorbed to the anode catalyst if a predetermined-amount anode gas is consumed.

The other indirect acquisition method includes a method of determining that the anode catalyst is deteriorated at the time of an initial computation after the start of the present control routine. This reason is that it can be considered that CO adsorbed during the previous operation remains on the anode catalyst at the time of the startup of the fuel cell system 100. In this case, there may be decided whether or not the controller determines that the anode catalyst is deteriorated at the time of an initial computation after the system startup in accordance with the previous operating time and a time from the previous operation end to the present operation start. Moreover, there is also a method of determining that the anode catalyst is deteriorated if a cumulative generated charge amount of the fuel cell stack 1 reaches a predetermined value.

In Step S130, the controller 6 executes the catalyst recovery process. The catalyst recovery process is a process for cross-leaking oxygen from the cathode side to the anode side by raising an oxygen partial pressure or by decreasing a hydrogen partial pressure described above.

In Step S140, the controller 6 performs the determination of whether to terminate the catalyst recovery process. The controller terminates the present routine when determining that the catalyst recovery process is terminated and continues the process of Step S130 when determining that the catalyst recovery process is not terminated.

The controller 6 determines that the anode catalyst is recovered from the CO poisoning and terminates the catalyst recovery process, when the performance of the fuel cell 10 is raised up to an assumed value, for example, when the voltage value is raised up to an assumed voltage value described above, based on the voltage value and the current value. In addition, when the rise of the voltage value stops during the catalyst recovery process, it can be considered that the anode catalyst is recovered from the CO poisoning.

Moreover, when the execution time of the catalyst recovery process reaches a predetermined time, the controller may terminate the catalyst recovery process.

The above is basic contents of the catalyst recovery process according to the present embodiment.

In the meantime, there is a characteristic that the state in which CO is adsorbed to the anode catalyst is unstable and CO is easy to be detached when the temperature of the anode catalyst is raised. That is to say, if the temperature of the anode catalyst is raised when executing the catalyst recovery process, the effect of the catalyst recovery process can be further enhanced. In addition, raising the temperature of the anode catalyst referred to here means raising the above temperature to be higher than the control temperature of the anode catalyst in a state (normal-running state) in which the catalyst recovery process is not executed.

Figure 11:
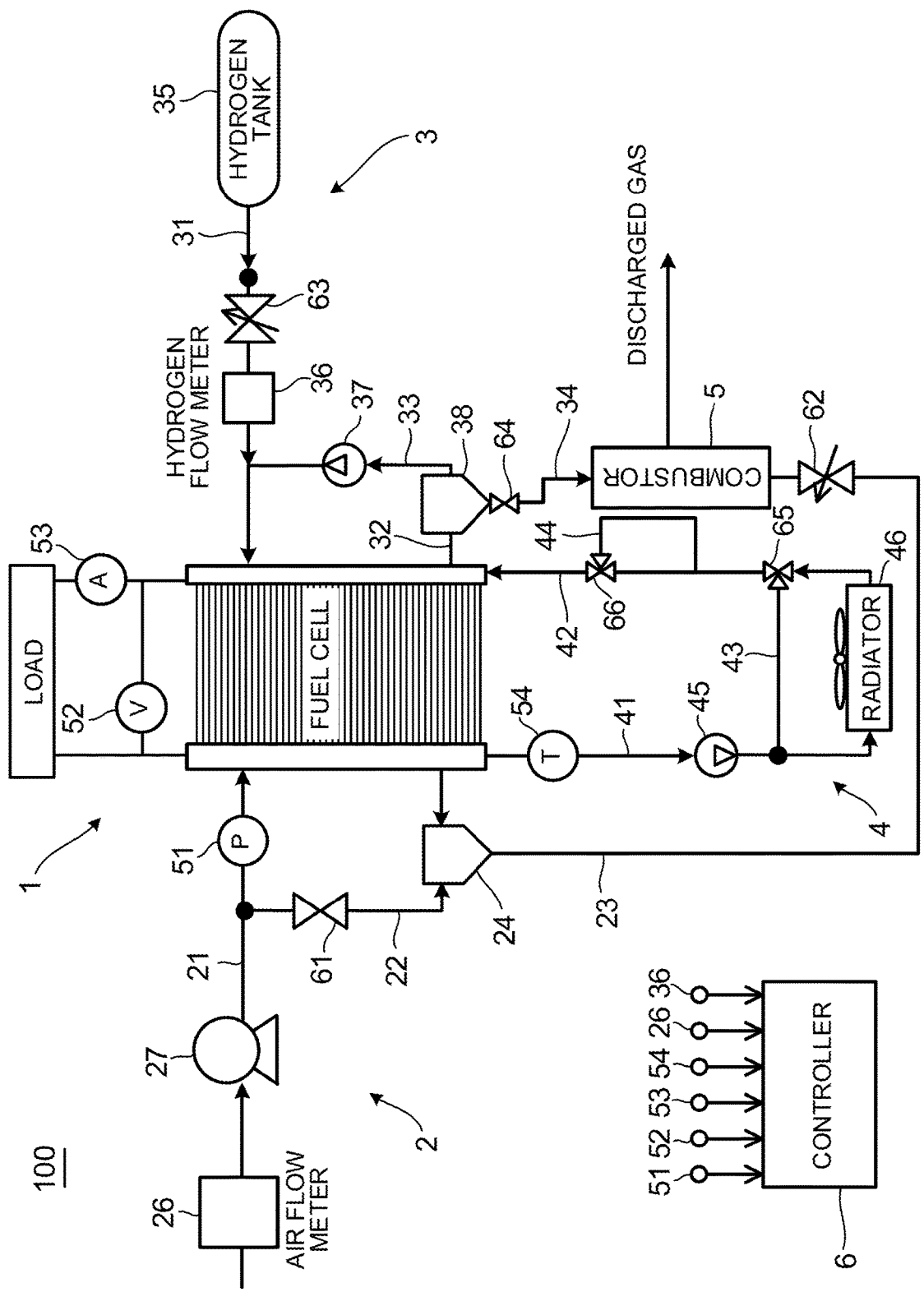
FIG. 11 is another example of the configuration diagram illustrating the fuel cell system.

FIG. 11 is a configuration diagram illustrating a system that can raise the temperature of the anode catalyst when executing the catalyst recovery process. The difference from FIG. 3 is that the cooling water circulation apparatus further includes a heating passage 44 and a flow-rate control valve 66 configured to adjust the flow rate of the heating passage 44.

The heating passage 44 is placed in such a manner that cooling water can exchange heat with the combustor 5. The flow-rate control valve 66 is controlled to be opened and closed by the controller 6 to make cooling water pass through the heating passage 44 when executing the catalyst recovery process.

When executing the catalyst recovery process, the controller 6 opens the flow-rate control valve 66 so that the cooling water passes through the cooling water bypass passage 43 without passing through the radiator 46. Then, the controller 6 supplies anode offgas and cathode gas to the combustor 5 to combust them and raises the cooling water temperature by using its combustion heat. As a result, the temperature of the fuel cell stack 1 is raised. If the temperature of the fuel cell stack 1 is raised, the temperature of the MEA 11 is naturally raised and the temperature of the anode catalyst included in the MEA 11 is also raised. In other words, according to the configuration of FIG. 11, it is possible to control the temperature of the anode catalyst and produce a state in which CO is easy to be detached by controlling the cooling water temperature.

In the configuration as described above, the effect of the catalyst recovery process can be further enhanced by raising the cooling water temperature when executing the catalyst recovery process. Moreover, because the cooling water temperature can be adjusted by controlling an opening degree of the flow-rate control valve 66, the deterioration of the anode catalyst due to heat can be avoided.

In addition, a heat source is not limited to the combustor 5. For example, a heater for heating may be newly provided. In this case, because it is not necessary to consider a positional relationship with the combustor 5, the layout of the cooling water circulation apparatus 4 is improved.

Next, an operational effect according to the present embodiment will be explained.

A catalyst deterioration recovery device according to the present embodiment includes the recovery control unit that recovers the performance decreased by the adsorption of carbon monoxide of the anode catalyst 112 in the fuel cell 10 and supplies at least a part of oxygen to be supplied to the cathode gas flow channels 131 to the anode catalyst 112 via the electrolyte membrane 111. In addition, the fuel cell 10 is formed by sandwiching the membrane electrode assembly (MEA) 11 configured to include the electrolyte membrane 111, the electrode catalyst layers 112A and 113A provided on both sides of the electrolyte membrane 111, and the gas diffusion layers 112B and 113B provided on surfaces opposite to the electrolyte membrane 111 of the electrode catalyst layers 112A and 113A between the anode separator 12 including the anode gas flow channels 121 and the cathode separator 13 including the cathode gas flow channels 131. Herein, the controller 6 acting as the recovery control unit controls an amount of oxygen permeating the electrolyte membrane 111 to recover the performance of the anode catalyst 112. As a result, it is possible to oxidize and detach CO adsorbed to the anode catalyst without raising the electric potential of the anode electrode 112. That is to say, the anode catalyst can be recovered from the CO poisoning while suppressing the deterioration of the electrolyte membrane caused by the exothermic reaction on the electrode catalyst.

Moreover, a catalyst deterioration recovery method according to the present embodiment supplies oxygen to the anode catalyst 112 in order to oxidize and detach carbon monoxide adsorbed to the anode catalyst 112 of the fuel cell system 100 described above and supplies at least a part of oxygen to be supplied to the cathode gas flow channels 131 to the anode catalyst 112 via the electrolyte membrane 111. As a result, similarly to the catalyst deterioration recovery device described above, the anode catalyst can be recovered from the CO poisoning while suppressing the deterioration of the electrolyte membrane caused by the exothermic reaction on the electrode catalyst.

The fuel cell system 100 according to the present embodiment includes the fuel gas adjusting apparatus that decreases at least one of the flow rate and pressure of fuel gas to be supplied to the anode gas flow channels 121. More specifically, the fuel gas adjusting apparatus is configured to include the hydrogen flow meter 36 and the hydrogen supply valve 63. The controller 6 controls an opening degree of the hydrogen supply valve 63 so that a flow rate to be detected by the hydrogen flow meter 36 is decreased. As a result, because the anode-side hydrogen concentration is decreased and a direct reaction between oxygen cross-leaked from the cathode side and CO adsorbed onto the anode catalyst is promoted, the anode catalyst can be recovered from the CO poisoning.

Instead of the fuel gas adjusting apparatus, the fuel cell system 100 according to the present embodiment may include the oxygen-containing gas adjusting apparatus that raises at least one of the flow rate and pressure of oxygen-containing gas to be supplied to the cathode gas flow channels 131. More specifically, the oxygen-containing gas adjusting apparatus is configured to include the compressor 27, the air flow meter 26, the cathode pressure sensor 51, and the cathode bypass valve 61. Herein, the controller 6 raises a rotation speed of the compressor 27 so that a flow rate to be detected by the air flow meter 26 is increased, or closes the cathode bypass valve 61 so that a pressure to be detected by the cathode pressure sensor 51 is increased. As a result, because the cathode-side oxygen concentration and oxygen partial pressure are increased to increase an amount of oxygen to be cross-leaked from the cathode side and thus a direct reaction between oxygen and CO adsorbed onto the anode catalyst is promoted, the anode catalyst can be recovered from the CO poisoning.

In addition, in the present embodiment, it is sufficient that the fuel cell system 100 includes at least one of the fuel gas adjusting apparatus and the oxygen-containing gas adjusting apparatus.

In the present embodiment, the fuel cell system 100 may further include a temperature control unit that controls the temperature of the membrane electrode assembly (MEA) 11. When executing the catalyst recovery process, the controller 6 causes the temperature control unit to raise the temperature of the MEA 11. The temperature control unit is configured to include the combustor 5, the heating passage 44, and the flow-rate control valve 66 that adjusts the flow rate of the heating passage 44. The temperature of the anode catalyst is also raised by raising the temperature of the MEA 11. Because CO adsorbed to the anode catalyst is in an unstable state and thus CO is easy to be detached when the temperature of the anode catalyst is raised, it is possible to further promote the catalyst recovery process according to the present embodiment.

In the present embodiment, the fuel cell system further includes a determining unit that determines whether to execute the catalyst recovery process. More specifically, the determining unit is included in the controller 6. The determining unit acquires whether the performance of the anode catalyst is degraded due to the CO poisoning, and determines that the catalyst recovery process is executed when the performance is degraded. Although the operating efficiency of the fuel cell system 100 may be decreased when executing the catalyst recovery process, the present embodiment can recover the performance of the anode catalyst while suppressing the degradation of the operating efficiency.

In the present embodiment, the determining unit detects or estimates whether the performance of the anode catalyst is degraded due to the CO poisoning based on the state of the fuel cell 10. As a result, the determining unit can appropriately determine whether the performance is degraded due to the CO poisoning.

In the present embodiment, the determining unit starts the catalyst recovery process and then performs the determination that the catalyst recovery process is stopped when the performance of the anode catalyst is recovered. That is to say, the controller 6 starts the catalyst recovery process and then terminates the catalyst recovery process when the anode catalyst is recovered from the CO poisoning. As a result, because to uselessly continue to execute the catalyst recovery process is ceased, the catalyst recovery process can be efficiently executed.

Second Embodiment

The present embodiment is similar to the first embodiment in light of the basic thinking of the catalyst recovery process of cross-leaking oxygen toward the anode, but is different from the first embodiment in light of a process for cross-leaking oxygen.

The first embodiment increases the partial pressure difference dP of oxygen so as to increase the permeation flux F of oxygen. On the contrary, the present embodiment increases the permeation coefficient k of oxygen so as to increase the permeation flux F of oxygen. Hereinafter, a method of increasing the permeation coefficient k will be explained.

Figure 12:
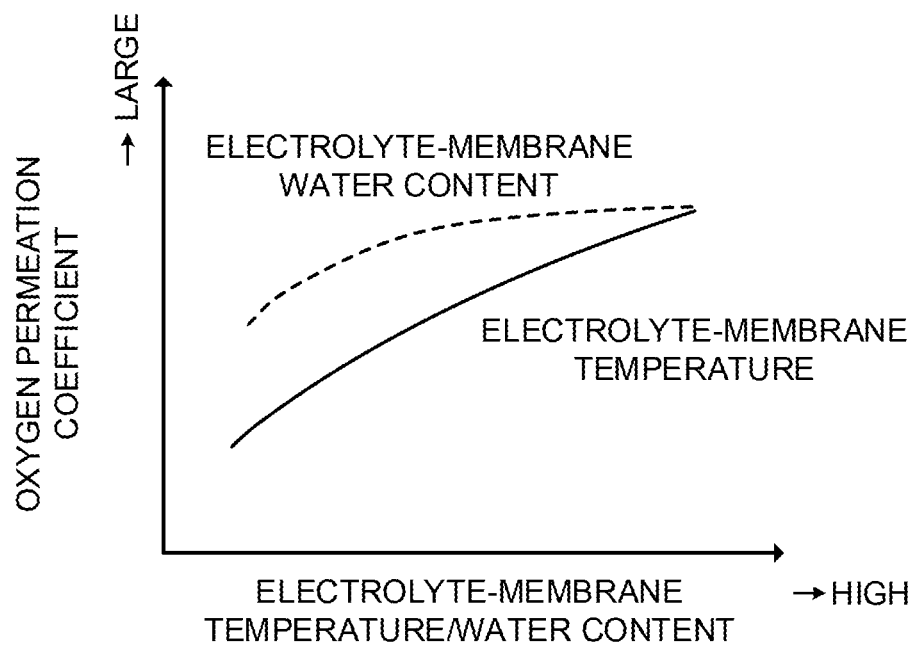
FIG. 12 is a diagram illustrating a relationship between an oxygen permeation coefficient and electrolyte-membrane temperature/water content.

FIG. 12 illustrates a relationship between the oxygen permeation coefficient of the electrolyte membrane 111 and the temperature and water content of the electrolyte membrane 111. As illustrated in FIG. 12, the electrolyte membrane 111 has a characteristic that the oxygen permeation coefficient grows larger as the temperature becomes higher. Moreover, as illustrated in FIG. 12, the electrolyte membrane 111 has a characteristic that the oxygen permeation coefficient grows larger as the water content becomes more, namely, the humidity becomes higher.

In other words, to increase the oxygen permeation coefficient k of the electrolyte membrane 111, it is sufficient to raise the temperature of the electrolyte membrane 111 or to raise the degree of humidity of the electrolyte membrane 111.

To raise the temperature of the electrolyte membrane 111, it is sufficient to raise the cooling water temperature by using the configuration of FIG. 11 explained in the first embodiment, for example. If the cooling water temperature is raised, the temperature of the fuel cell stack 1 is also raised. That the temperature of the fuel cell stack 1 is raised means that the temperature of the MEA 11 is naturally raised and the temperature of the electrolyte membrane 111 included in the MEA 11 is also raised.

Figure 13:
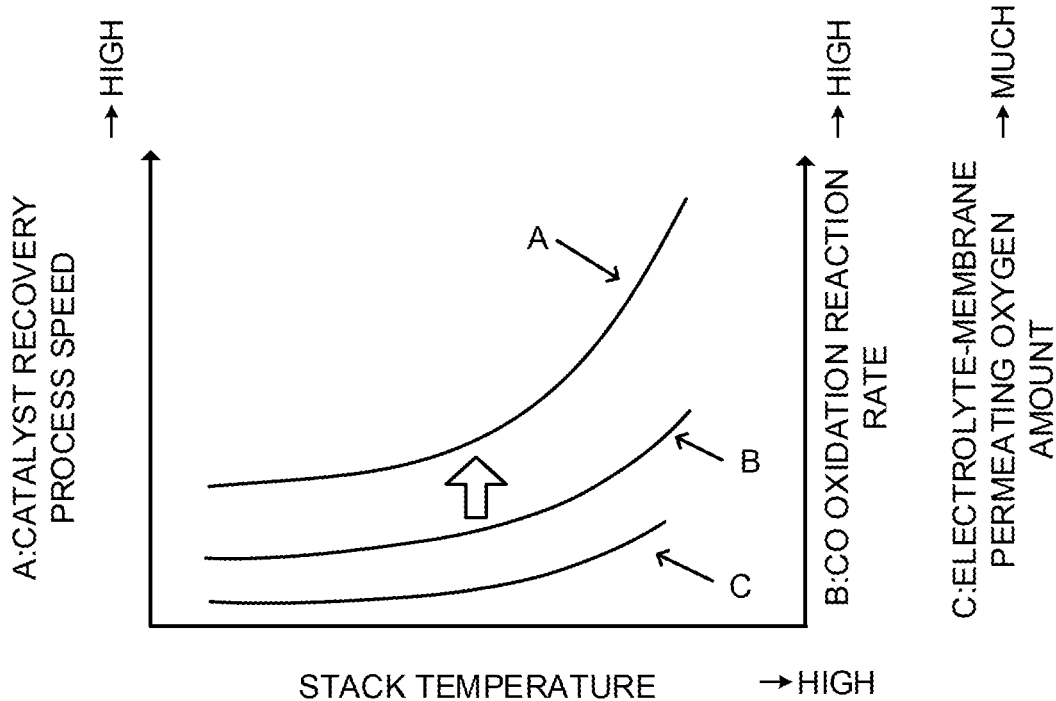
FIG. 13 is a diagram illustrating a relationship between a catalyst recovery process speed and a stack temperature.

FIG. 13 is a diagram illustrating a relationship between the temperature (stack temperature) of the fuel cell stack 1 and a catalyst recovery process speed. In FIG. 13, the left vertical axis indicates the catalyst recovery process speed, the right vertical axis indicates an oxidation reaction rate of CO and an amount of oxygen permeating the electrolyte membrane 111, and the horizontal axis indicates the stack temperature.

As the temperature of the fuel cell stack 1 becomes higher, the temperature of the anode catalyst becomes higher and thus CO becomes easier to be oxidized as described in the first embodiment. That is to say, as illustrated in FIG. 13, the oxidation reaction rate of CO becomes higher as the temperature of the fuel cell stack 1 becomes higher. Moreover, as the temperature of the fuel cell stack 1 becomes higher, the temperature of the electrolyte membrane 111 also becomes higher and thus the permeation flux of the electrolyte membrane 111 grows larger as described above. That is to say, as illustrated in FIG. 13, as the temperature of the fuel cell stack 1 becomes higher, an amount of oxygen permeating the electrolyte membrane 111 becomes more. Herein, due to a synergistic effect of the increase in the amount of oxygen permeating the electrolyte membrane 111 and the increase in the oxidation reaction rate of CO on the anode catalyst, the catalyst recovery process speed becomes higher as the temperature of the fuel cell stack 1 gets higher.

On the other hand, to raise the degree of humidity of the electrolyte membrane 111, it is sufficient to increase the humidification amount of the fuel cell stack 1. For example, in the configuration of FIG. 11, the humidification amount can be adjusted by controlling the circulation amount of the anode offgas. In other words, by raising the rotation speed of the hydrogen circulating pump 37 to increase the circulation amount of the anode offgas, diffusion of the generated water into anode gas in the anode electrode is promoted and the degree of humidity of the electrolyte membrane 111 is consequently raised.

The moisture control of the electrolyte membrane 111 performed by circulating anode offgas is generally performed to achieve a preferable power generation state. That is to say, the system itself for circulating anode offgas is general. Therefore, if this system is used for the catalyst recovery process, humidity adjustment for the catalyst recovery process is enabled without providing a new humidity adjustment device.

Figure 14:
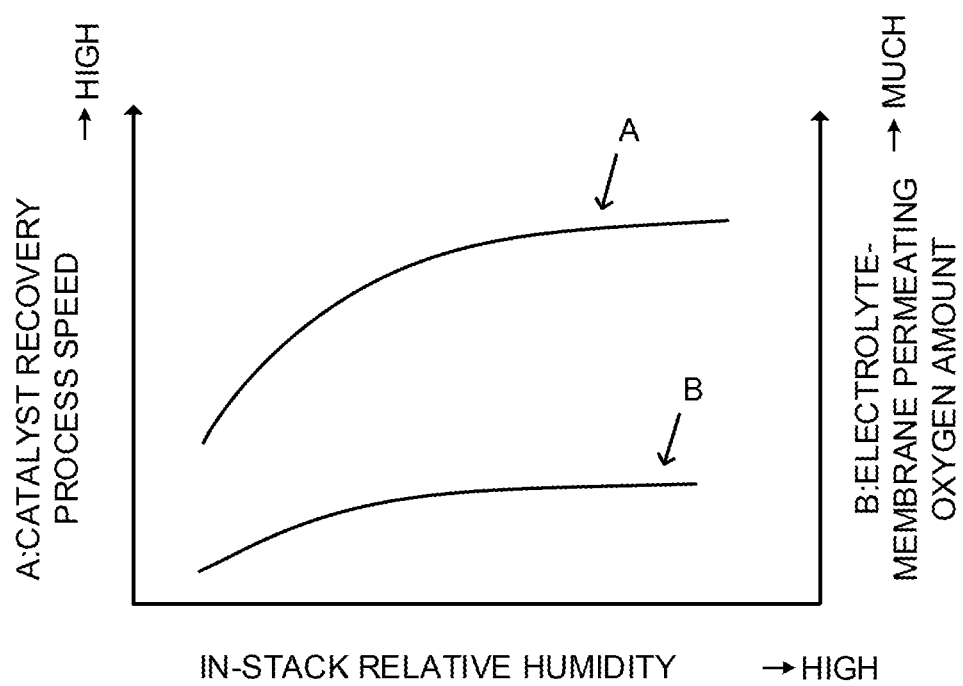
FIG. 14 is a diagram illustrating a relationship between a catalyst recovery process speed and an in-stack relative humidity.

FIG. 14 is a diagram illustrating a relationship between a degree of humidity (in-stack relative humidity) of the fuel cell stack 1 and a catalyst recovery process speed. In FIG. 14, the left vertical axis indicates the catalyst recovery process speed, the right vertical axis indicates an amount of oxygen permeating the electrolyte membrane 111, and the horizontal axis indicates the in-stack relative humidity.

Because the oxygen permeation coefficient grows larger as described above as the humidity degree of the fuel cell stack 1 becomes higher, the amount of oxygen permeating the electrolyte membrane 111 becomes more as illustrated in FIG. 14. For this reason, the catalyst recovery process speed becomes higher as the humidity degree of the fuel cell stack 1 becomes higher as illustrated in FIG. 14.

As described above, the present embodiment controls at least one of the temperature and the humidity degree of the fuel cell stack 1 as the catalyst recovery process.

In the meantime, when executing the catalyst recovery process according to the present embodiment, cathode gas (oxygen-containing gas) containing higher-ratio oxygen than a stoichiometric ratio may be supplied to the cathode electrode 113. According to this, because the oxygen partial pressure of cathode gas becomes high, the permeation flux of the electrolyte membrane 111 becomes larger and thus the catalyst recovery process speed is further increased. Moreover, similarly to the first embodiment, the controller 6 may execute the catalyst recovery process only when detecting the deterioration of the anode catalyst. These control routines are organized as a flowchart like FIG. 15.

Figure 15:
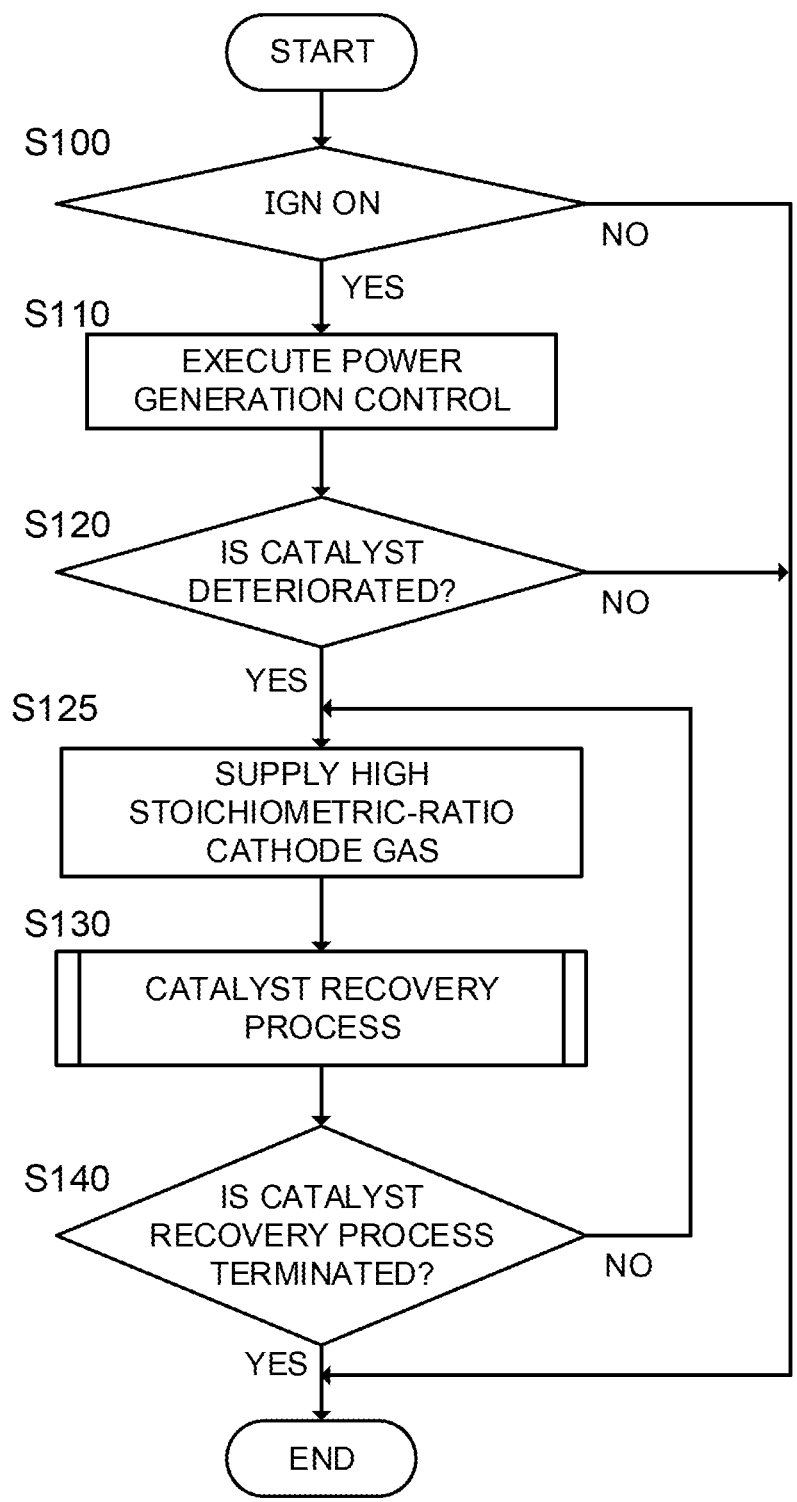
FIG. 15 is a flowchart illustrating a control routine of a catalyst recovery process.

FIG. 15 is a flowchart obtained by adding Step S125 between Step S120 and Step S130 of the flowchart of FIG. 10. Moreover, the processing matter of Step S130 is different from that of the first embodiment.

If it is determined that the anode catalyst is deteriorated in Step S120, the controller 6 supplies cathode gas (oxygen-containing gas) containing higher-ratio (high stoichiometric-ratio) oxygen than the stoichiometric ratio to the cathode electrode 113 in Step S125.

Then, the controller 6 executes the catalyst recovery process in Step S130. In the present embodiment, the controller raises at least one of the temperature and the humidity degree of the fuel cell stack 1.

According to the control routine of FIG. 15, because an oxygen partial pressure is increased by supplying high stoichiometric-ratio cathode gas (oxygen-containing gas) in Step S125, the effect of the catalyst recovery process of raising an oxygen permeation flux in Step S130 is further promoted. Moreover, a hydrogen consumption amount according to the catalyst recovery process can be suppressed by executing the catalyst recovery process only when detecting the deterioration of the catalyst.

In FIG. 15, when it is determined that the catalyst is deteriorated in Step S120, the controller 6 starts to supply cathode gas (oxygen-containing gas) containing high stoichiometric-ratio oxygen in Step S125 and starts the catalyst recovery process in Step S130. However, before Step S125, the controller may determine whether the catalyst recovery process is permitted. For example, in the case where the temperature of the fuel cell stack 1 is raised as the catalyst recovery process, the controller 6 does not permit the catalyst recovery process when the combustor 5 cannot generate an amount of heat required for the catalyst recovery process. Moreover, in the case where the humidity degree of the fuel cell stack 1 is raised as the catalyst recovery process, the controller 6 does not permit the catalyst recovery process when it is impossible to circulate sufficient anode gas to realize a humidity degree required for the catalyst recovery process. By determining whether to permit the catalyst recovery process in this way, it is possible to avoid executing the catalyst recovery process in the situation where the catalyst recovery process has no effect or has a small effect.

Next, the effect according to the present embodiment will be explained.

In the present embodiment, the fuel cell system 100 includes a permeation coefficient control device that controls the oxygen permeation coefficient of the electrolyte membrane 111. The permeation coefficient control device is a device that controls at least one of the temperature or water content of the MEA 11 to control the oxygen permeation coefficient. If the controller 6 increases the oxygen permeation coefficient by using the permeation coefficient control device, the catalyst recovery process can be promoted because the amount of oxygen cross-leaked is increased.

The permeation coefficient control device is a device that adjusts the temperature of cooling water, for example. More specifically, the permeation coefficient control device is configured to include the combustor 5, the heating passage 44, and the flow-rate control valve 66 that adjusts the flow rate of the heating passage 44. When the temperature of cooling water is raised, the temperature of the MEA 11 is raised and consequently the temperature of the electrolyte membrane 111 is raised. That is to say, in the present embodiment, the controller 6 controls the temperature of the MEA 11 by adjusting the temperature of cooling water, but essentially controls the temperature of the electrolyte membrane 111. Herein, if the temperature of the electrolyte membrane 111 is raised, the oxygen permeation coefficient is increased to increase the amount of oxygen cross-leaked and thus the catalyst recovery process is promoted.

In the present embodiment, the permeation coefficient control device may be a device that adjusts the humidification amount of the fuel cell 10. More specifically, the permeation coefficient control device is configured to include the anode gas discharge passage 32, the anode gas circulation passage 33, the hydrogen circulating pump 37, and the purge valve 64, and is a device that circulates offgas discharged from the anode electrode to the anode electrode. If the humidity degree of the electrolyte membrane 111 is raised by this device, the oxygen permeation coefficient is increased to increase the amount of oxygen cross-leaked and thus the catalyst recovery process is promoted.

In the present embodiment, the permeation coefficient control device may supply cathode gas (oxygen-containing gas) containing higher-ratio oxygen than the stoichiometric ratio to the cathode electrode in operation. As a result, because an oxygen partial pressure in cathode gas is increased, the permeation flux of Equation (4) is increased and thus the catalyst recovery process is promoted.

As described above, the embodiments of the present invention have been explained, but the above embodiments are only a part of the application example of the present invention and the technical scope of the present invention is not intended to be limited to the specific configurations of the above embodiments.

The invention claimed is:

1. A catalyst deterioration recovery device in a fuel cell system that includes a fuel cell including: a membrane electrode assembly configured to include an electrolyte membrane and anode and cathode catalysts between which the electrolyte membrane is sandwiched from both sides; and anode and cathode separators respectively including an anode gas flow channel and a cathode gas flow channel, the membrane electrode assembly being sandwiched between the anode and cathode separators, the catalyst deterioration recovery device recovering performance decreased by adsorption of carbon monoxide to the anode catalyst, the catalyst deterioration recovery device comprising a recovery control unit configured to supply at least a part of oxygen to be supplied to the cathode gas flow channel to the anode catalyst via the electrolyte membrane, wherein the recovery control unit controls an amount of oxygen permeating the electrolyte membrane so as to recover the performance of the anode catalyst.

2. The catalyst deterioration recovery device according to claim 1, wherein the fuel cell system further includes an oxygen-containing gas adjusting apparatus that adjusts a flow rate or a pressure of oxygen-containing gas to be supplied to the cathode gas flow channel, and the recovery control unit raises at least one of the flow rate and the pressure of the oxygen-containing gas to be supplied to the cathode gas flow channel by using the oxygen-containing gas adjusting apparatus so as to control the amount of oxygen permeating the electrolyte membrane.

3. The catalyst deterioration recovery device according to claim 1, wherein the fuel cell system further includes a fuel gas adjusting apparatus that adjusts a flow rate or a pressure of fuel gas to be supplied to the anode gas flow channel, and the recovery control unit decreases at least one of the flow rate and the pressure of the fuel gas to be supplied to the anode gas flow channel by using the fuel gas adjusting apparatus so as to control the amount of oxygen permeating the electrolyte membrane.

4. The catalyst deterioration recovery device according to claim 1, wherein the fuel cell system further includes a fuel gas adjusting apparatus that adjusts a flow rate or a pressure of fuel gas to be supplied to the anode gas flow channel and an oxygen-containing gas adjusting apparatus that adjusts a flow rate or a pressure of oxygen-containing gas to be supplied to the cathode gas flow channel, and the recovery control unit executes at least one of: decreasing at least one of the flow rate and the pressure of the fuel gas to be supplied to the anode gas flow channel by using the fuel gas adjusting apparatus; and raising at least one of the flow rate and the pressure of the oxygen-containing gas to be supplied to the cathode gas flow channel by using the oxygen-containing gas adjusting apparatus so as to control the amount of oxygen permeating the electrolyte membrane.

5. The catalyst deterioration recovery device according to claim 1, wherein the fuel cell system further includes a temperature control unit configured to control a temperature of the membrane electrode assembly, and the recovery control unit causes the temperature control unit to raise the temperature of the membrane electrode assembly when recovering the performance of the anode catalyst.

6. The catalyst deterioration recovery device according to claim 1, wherein the recovery control unit controls an oxygen permeation coefficient of the electrolyte membrane so as to control the amount of oxygen permeating the electrolyte membrane.

7. The catalyst deterioration recovery device according to claim 6, wherein
the fuel cell system further includes a permeation coefficient control device that controls at least one of a temperature and a water content of the membrane electrode assembly, and
the recovery control unit controls the oxygen permeation coefficient by using the permeation coefficient control device.

8. The catalyst deterioration recovery device according to claim 7, wherein
the fuel cell system further includes a device configured to heat cooling water as the permeation coefficient control device, and
the recovery control unit raises a temperature of the cooling water so as to control the temperature of the membrane electrode assembly.

9. The catalyst deterioration recovery device according to claim 7, wherein
the fuel cell system further includes a circulation apparatus, which circulates offgas discharged from an anode electrode to the anode electrode, as the permeation coefficient control device, and
the recovery control unit controls a circulation amount of the offgas so as to increase the water content of the membrane electrode assembly.

10. The catalyst deterioration recovery device according to claim 6, wherein the recovery control unit supplies the oxygen-containing gas containing higher-ratio oxygen than a stoichiometric ratio to a cathode electrode when activating the permeation coefficient control device.

11. The catalyst deterioration recovery device according to claim 1, wherein the recovery control unit further includes a determining unit that determines whether or not to supply at least a part of oxygen to be supplied to the cathode gas flow channel to the anode catalyst via the electrolyte membrane.

12. The catalyst deterioration recovery device according to claim 11, wherein the determining unit acquires whether the performance of the anode catalyst is degraded by the adsorption of carbon monoxide and determines to supply to the anode catalyst via the electrolyte membrane when the performance is degraded.

13. The catalyst deterioration recovery device according to claim 12, wherein the determining unit detects or estimate whether the performance of the anode catalyst is degraded by the adsorption of carbon monoxide based on a state of the fuel cell.

14. The catalyst deterioration recovery device according to claim 12, wherein the determining unit starts to supply oxygen to the anode catalyst through the electrolyte membrane and then stops supplying the oxygen when the performance of the anode catalyst is recovered.

15. A catalyst deterioration recovery method for a fuel cell system that includes a fuel cell including: a membrane electrode assembly configured to include an electrolyte membrane and anode and cathode catalysts between which the electrolyte membrane is sandwiched from both sides; and anode and cathode separators respectively including an anode gas flow channel and a cathode gas flow channel, the membrane electrode assembly being sandwiched between the anode and cathode separators, the catalyst deterioration recovery method supplying oxygen to the anode catalyst in order to oxidize carbon monoxide adsorbed to the anode catalyst to detach the carbon monoxide from the anode catalyst, the catalyst deterioration recovery method comprising:
supplying oxygen to the cathode gas flow channel;
supplying at least a part of the oxygen to the anode-side electrode catalyst layer via the electrolyte membrane; and
controlling an amount of oxygen permeating the electrolyte membrane so as to recover the performance of the anode catalyst.

* * * * *